Jan. 24, 1956 C. E. RECORDS 2,732,078
CEMENTED GRAVEL FILTER BLOCK
Filed June 17, 1952 2 Sheets-Sheet 1
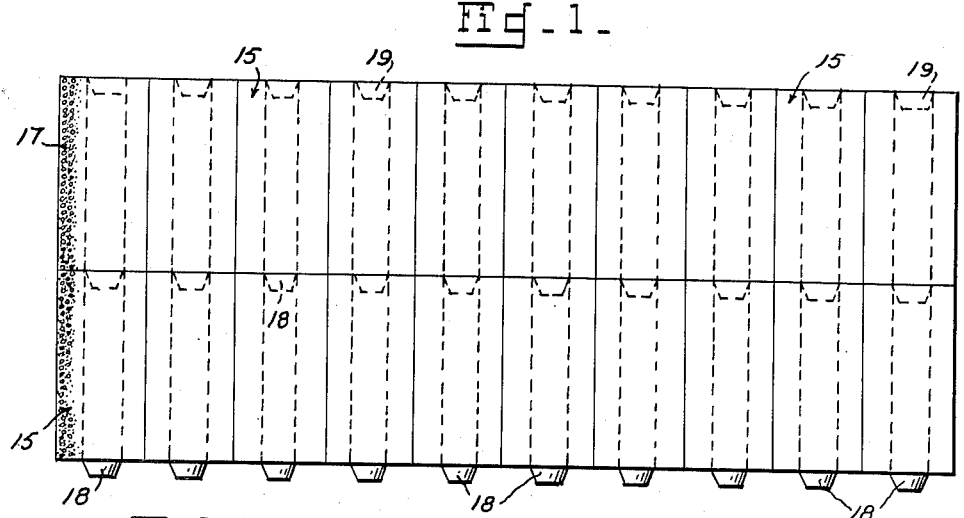
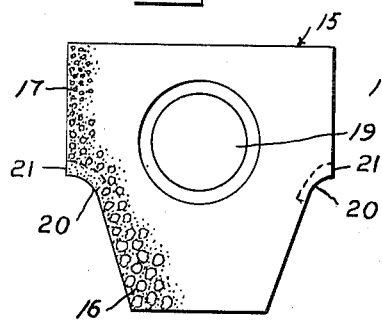
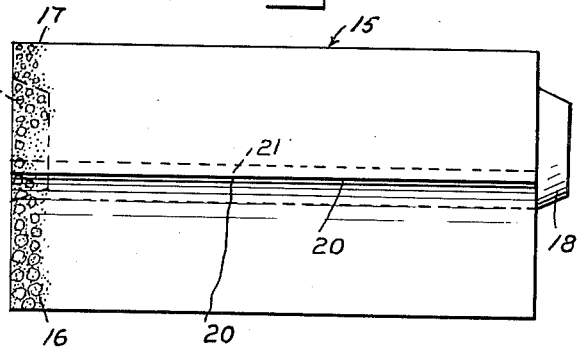
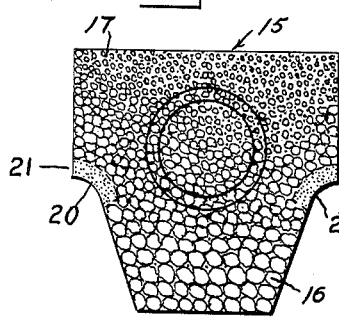
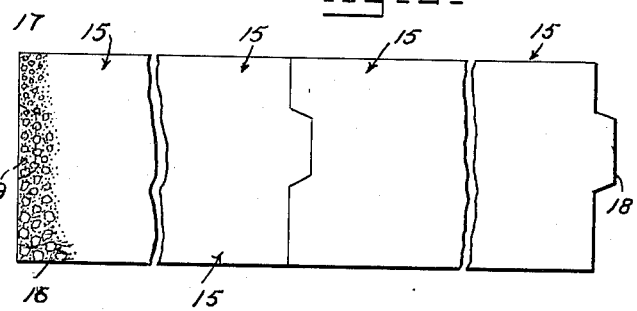
INVENTOR·
Chester E. Records,
BY
ATTORNEY

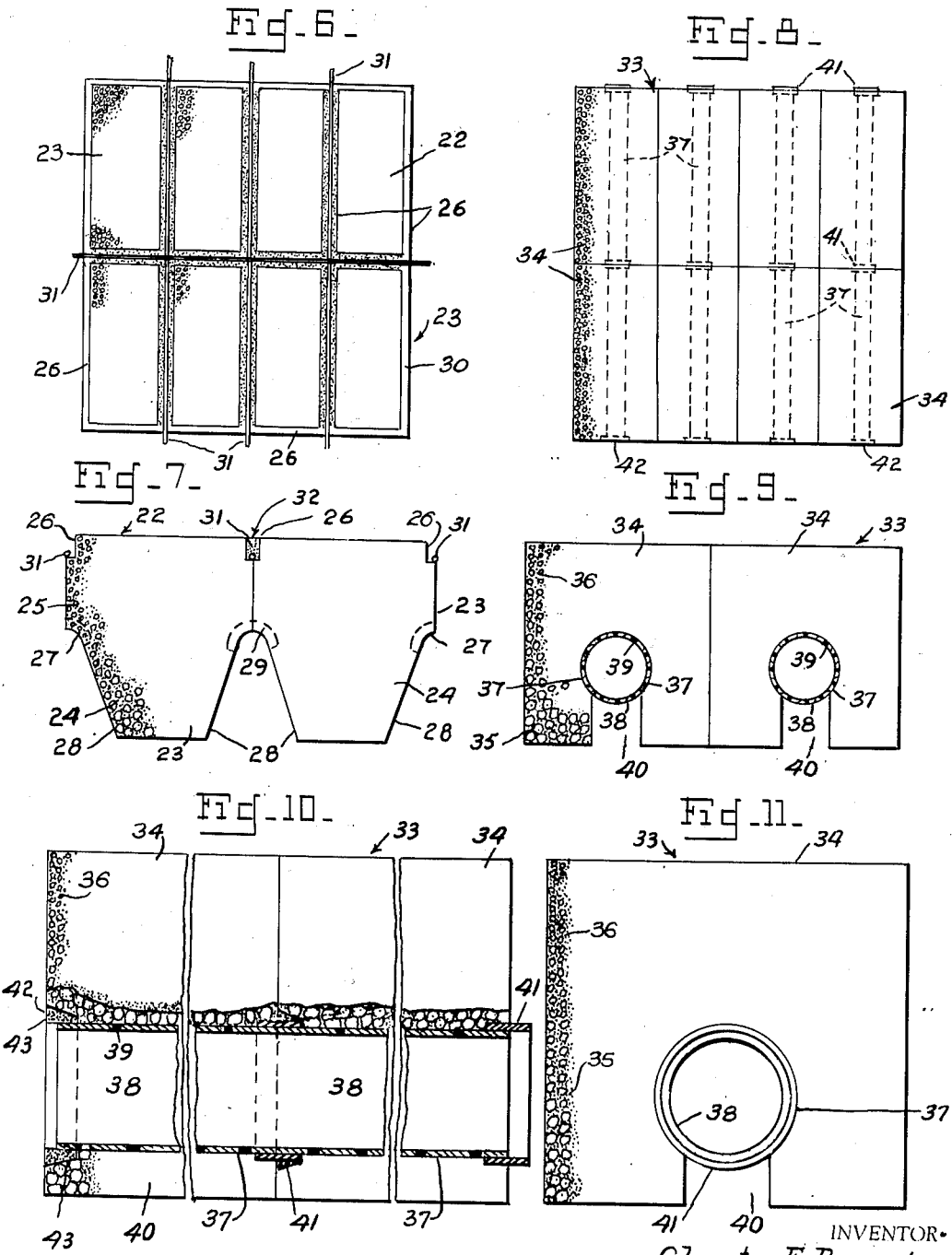

10

United States Patent Office 2,732,078
Patented Jan. 24, 1956

2,732,078
CEMENTED GRAVEL FILTER BLOCK

Chester Ellsworth Records, Columbus, Ohio

Application June 17, 1952, Serial No. 294,038

4 Claims. (Cl. 210—171)

This invention relates to a cemented gravel filter block which is especially adapted for use in filter beds for filtering water.

In conventional types of filter beds for filtering water, a layer of filtering material such as coarse gravel is first spread on the bottom of the bed. Upon this first layer a second layer of smaller gravel is placed. In this layer none of the gravel is of a size to pass through the interstices of the first layer.

Subsequent graded layers of gravel are placed on the second layer, in like manner, until the gravel being used has been reduced to very small pebbles which is commonly known as sand.

The layers are used for straining solids out of the water, and in the course of filtration the solids collected become so massed on top of the sand that water will not pass therethrough, and such mass or debris must be removed before further filtration can be effected.

To remove this mass or debris on top of the sand, it is common practice to reverse the flow of water which will lift the mass or debris from the top of the sand so that the mass or debris will be discharged through the overflow.

The reversing of the flow of water causes a disturbance of the filtering materials. Should too much pressure appear in one spot, all of the layers of gravel, at this spot, will be lifted and when it returns, the gravel is not in the proper graded relation, or in the proper location. This has been overcome to some extent by different methods of diffusing the water over the filter bed, but such methods are not completely successful in their operations.

An object of this invention, therefore, is to provide a filter bed that will comprise, except for the sand, a heterogeneous mass of gravel, the layers of filtering material, except for the sand, being bonded together so that diffusion becomes of minor importance. The manner of arranging the layers of filtering material in a fixed structure provides an ideal diffuser for distributing the water equally under the sand when it is being backwashed.

Another object of this invention is to provide a filter block which will comply in its composition of graded filter material to conventional filter beds, but to so bond the filtering material that it will not be disturbed by the reversal of the flow of water.

A further object of the invention is, therefore, the provision of a filtering bed composed of a plurality of such blocks so that the required area is completely covered by the blocks, and then all of the blocks are bonded together to form a cemented gravel filter bed.

With these and other objects in view, as will be apparent from the following disclosure, the invention resides in the composition of matter and the construction herein described, and as set forth in the specification and covered by the claims appended hereto.

In the accompanying drawings illustrating the invention:

Fig. 1 represents a top plan view of a filter bed constructed in accordance with the invention;

Fig. 2 is a view of one end of a block used in the construction of the filter bed of Fig. 1;

Fig. 3 is a side view of the filter block of Fig. 2;

Fig. 4 is a view of the opposite end of the block of Figs. 2 and 3;

Fig. 5 is an enlarged end view of the filter bed of Fig. 1;

Fig. 6 is a top plan view of a filter bed showing the use of a modified form of block;

Fig. 7 is an enlarged end view of two of the modified forms of blocks comprising the filter bed of Fig. 6;

Fig. 8 is a top plan view of a filter bed showing the use of another modified form of block;

Fig. 9 is an enlarged end view of two of the modified form of blocks comprising the filter bed of Fig. 8;

Fig. 10 is a longitudinal side view of two of the form of blocks of Fig. 9; and

Fig. 11 is an enlarged end view of the blocks of Fig. 9.

In the form of the invention shown in Figs. 1 to 5 inclusive, the blocks 15 at the lower portion thereof comprise a plurality of coarse pebbles 16. Upon these coarse pebbles are placed a grading of smaller pebbles 17 that are of a size to prevent sand placed on the filter bed from entering the interstices of the smaller pebbles. The filter blocks are thus composed of layers of gravel with the contact points of the pebbles cemented together with any conventional type of cement, this procedure being fully explained in my Patent 1,992,718. The filtering blocks would be further treated with a preparation to protect the cement from destructive elements in the water, as covered by my Patent 2,392,263.

When the block has been formed, as above set forth, one end of the block is provided with a circular tapered projection 18. The other end of the block is provided with an inwardly tapered recess 19 of a size to receive a projection 18 on a similar block. Thus when the blocks are in the position shown in Fig. 1, the projections 18 are received in the recesses 19 to provide a continuous filter bed for the disposition of the sand thereon.

The block 15 has a flat top and bottom, and a portion of each side of the block is flat, as shown in Figs. 2 and 4. The bottom of the block is approximately one-half of the width of the top of the block, and the sides of approximately one-half of the block are flat. Viewing Fig. 4, it will be seen that the remaining portions of the sides of the block are recessed with an arcuate formation 20 at the top so that when the blocks are positioned, as in Fig. 1, a channel is formed between adjoining blocks that extends the width or length of the filter bed, depending upon the manner of laying the filter blocks to form the bed. This channel is used for conducting water away from the filter bed and for the entrance of backwash water.

When the blocks are laid, as in Fig. 1, cement 21 is added to each arcuate recess formation 20, at the roof of the channel, to form a solid unbroken nonporous top. This cement forms a baffle which prevents the backwash water from rising vertically through the block. Thus the water will pass out through the sides of the channel and the water is diffused as it passes out through the cemented mass of pebbles.

When the filter is functioning normally, the water passes out between the pebbles 16, through the walls of the channel and the water is conducted to the openings in the floor of the filter bottom that is beneath the filter bed of Fig. 1. The water will thus be conducted away from the filter by pumping or other conventional means used by the particular filter plant.

In laying the blocks to form the filter bed of Fig. 1, cement is placed on the bottom of each filter block to fix it to the filter bottom on which it is placed.

In a filter bed of this type of construction, the water may be reversed in its flow and the porosity of the blocks will effectively distribute the water to prevent dislodging of the layer of sand on the bed, the cement baffle 21 preventing dislodgement of the sand to any great extent.

In the filter bed 22, shown in Fig. 6, a block 23 of a configuration similar to the block of Figs. 1 to 5 inclusive, is used. This block also comprises coarse pebbles 24 and smaller graded pebbles 25 bonded together, as previously set forth.

However, in this form of the block the projection 18 and recess 19 are omitted and each upper longitudinal and transverse edge of the block 23 is cut away, as at 26.

In Fig. 7 the arcuate formation 27 is clearly shown forming the channel 28, which is closed at the top by the cement 29.

The blocks are laid in a similar manner except that in the channel 30, formed by the cutouts 26, a reinforcing rod 31 is placed, and cement 32 is placed in the channel 30 to bond the blocks in unitary assembly.

The rods 31 may be anchored at their ends and with the blocks tied together by the cement 32, the entire filter bed will be prevented from lifting up when the flow of water is reversed. The cement placed on the bottom of each block will prevent pin-point loads from cracking the blocks.

The use of the cement 21 in the blocks of Fig. 1 and the use of the cement 29 in the blocks of Fig. 7 provide a very important feature of this invention. The provision of these layers or strips of cement in the roof of the channel, formed by the positioning of adjoining blocks, determines the successful use of the filter bed. As has already been pointed out the solid roof of the channel, as provided by these layers or strips of cement, prevents the backwash water from taking a short cut through the top of the channel up through the top of the filter bed. Thus the direction of the flow of the backwash water can be influenced by the width of the cement layers or strips extending from the roof of the channel to the bottom of the channel, terminating at the bottom of the block. The layers or strips of cement give rigidity to the block since they act as stiffening or reinforcing layers or strips for the blocks.

In the Figs. 8 to 11 inclusive, a further modified form of the invention is disclosed. A filter bed 33, as in Fig. 8, is provided from a plurality of graded gravel blocks 34. This form of block is substantially rectangular in cross-section and, as in the previous forms, coarse pebbles 35 from the lower portion of the block and small graded pebbles 36 provide the remaining portion of the block.

The block is provided with a longitudinally extending circular channel 37 in which is positioned a tube 38. The tube 38 is provided with a plurality of spaced perforations 39 as shown in Figs. 9 and 10. By means of the perforations 39 the tube communicates with a longitudinally extending passageway 40 which opens from the channel 37 through the bottom of the block 34. The tube 38 may be made from metal, plastic or other suitable material.

One end of the block 34 is provided with an extended coupling 41 while the other end of the block is provided with a circular tapered recess 42 which receives the extended coupling 41 of an adjoining block, as shown in Fig. 10.

When the blocks 34 are assembled to form a filter bed, as in Fig. 8, the coupling 41 enters the recess 42, and cement 43, Fig. 10, which has been previously positioned in the recess 42, will join the blocks in fixed relation to each other.

In this form of the invention the water will pass into or out of the block 34, by the way of the perforation 39 in the tube 38 and the passageway 40. In this form, the tube 38 functions as a baffle preventing concentrated water pressure which would disturb the sand of the filter layer.

It is to be noted that the pebbles in the various forms of the block are not joined by the cement so that porosity is sacrificed. The blocks are still porous, but they are not susceptible to separation, as is the conventional filter bed.

It is also to be noted that the entire bed could be cast in a filter bottom by use of the proper equipment and skill, without recourse to the use of separate blocks. However, a better filter bed will be provided if the blocks are precast and then placed in the filter bottom and joined in fixed relation to each other. The shapes or sizes of the various blocks could be changed as required to meet the existing problems.

Grading the gravel or pebbles into uniform sizes assists diffusion. Mixing the different sizes together reduces the porosity of the filter bed somewhat, as compared to a completely loose gravel bed. However, porosity to a great extent, does exist and the joining of the gravel or pebbles increases the friction against the reverse flow of water.

This invention, therefore, provides a filter bed that is effective in preventing the displacement of the filtering elements under reverse flow of water.

Therefore, while the various forms of the invention have been described in detail, it will be evident, of course, that the formation of the various parts may be varied to a certain degree without departing from the spirit of the invention, and thus the invention is not to be limited to the particular construction shown and described except as complying with the scope of the appended claims.

Having thus described the invention what is claimed as new and desired to be protected by Letters Patent is:

1. A block for use in a filter bed comprising gravel having the contact points thereof bonded together to form a porous molded block, said block having the gravel disposed in strata with the gravel in each stratum being of generally uniform grade, the gravel being of diminishing size from the bottom to the top of the block, said block having a channel forming recess in a lower surface face opening toward the bottom thereof and extending the length of the block, said block having a layer of nonporous material lining an upper portion of said surface face of said channel recess thereby causing fluid to diffuse through all the strata of the block in its passage to and from said channel recess.

2. A block for use in a filter bed comprising gravel having the contact points thereof bonded together to form a porous molded block, said block having the gravel disposed in strata with the gravel in each stratum being of generally uniform grade, the gravel being of diminishing size from the bottom to the top of the block, said block having a channel forming recess in a lower surface face opening toward the bottom thereof and extending the length of the block, said block having a layer of nonporous material lining an upper portion of said surface face of said channel recess thereby causing fluid to diffuse through all the strata of the block in its passage to and from said channel recess, said channel forming recess comprising a concave wall opening into the bottom and one side of said block adapted to form with a complemental concave wall on an adjoining block a drainage channel between the blocks, said lining of nonporous material lining the portion of said concave wall adjacent the juncture thereof with the side wall of the block.

3. A filter bed, comprising a plurality of blocks formed of gravel having the contact points thereof bonded together to form a porous molded mass of block form, said gravel being arranged in strata with the gravel in each stratum of substantially uniform grade but with the gravel in a lower stratum being of a coarser grade than that of the stratum thereabove, each said block being provided with concave side wall portions forming recesses in the opposite sides of the block and opening into the bottom thereof, said blocks being arranged in side-by-side and end-to-end relation with the recesses in the sides thereof cooperatively forming channels throughout the area of the bed, a layer of nonporous material lining the roof of each concave wall and cooperatively forming with the corresponding lining of an adjacent block, a nonporous roof for each channel causing liquid to diffuse only through the side walls of the channels to pass through all the strata of each block in liquid passage to and from the channel through the block.

4. A block for use in a filter bed comprising gravel having the contact points thereof bonded together to form a porous molded block, said block having the gravel disposed in strata with the gravel in each stratum being of generally uniform grade, the gravel being of diminishing size from the bottom to the top of the block, said block having a channel forming recess in a lower surface face opening toward the bottom thereof, said block having a layer of nonporous material lining an upper portion of said surface face of said channel recess thereby causing fluid to diffuse through all the strata of the block in its passage to and from said channel recess.

References Cited in the file of this patent

UNITED STATES PATENTS

| | | |
|---|---|---|
| 907,328 | Freeman | Dec. 22, 1908 |
| 968,226 | Ziller | Aug. 23, 1910 |
| 1,114,763 | Hodkinson | Oct. 27, 1914 |
| 1,883,468 | Barbour | Oct. 18, 1932 |
| 1,910,758 | Dundore | May 23, 1933 |
| 1,992,718 | Records | Feb. 26, 1935 |
| 2,043,734 | Camp | June 9, 1936 |
| 2,077,512 | Buchloh | Apr. 20, 1937 |
| 2,154,167 | Jenks | Apr. 11, 1939 |
| 2,378,239 | Myron | June 12, 1945 |

FOREIGN PATENTS

| | | |
|---|---|---|
| 332,535 | France | Oct. 30, 1903 |
| 502,655 | Belgium | May 15, 1951 |